INVENTOR.
Herman F. Holl
BY
HIS ATTORNEYS

Sept. 29, 1964 H. F. HOLL 3,150,633
FILTER CONDITION INDICATOR DEVICE
Filed July 24, 1962 4 Sheets-Sheet 2

INVENTOR.
Herman F. Holl
BY Webb Mackey & Burden
HIS ATTORNEYS

INVENTOR.
Herman F. Holl
BY Webb, Mackey & Burden
HIS ATTORNEYS

Sept. 29, 1964   H. F. HOLL   3,150,633
FILTER CONDITION INDICATOR DEVICE
Filed July 24, 1962   4 Sheets-Sheet 4
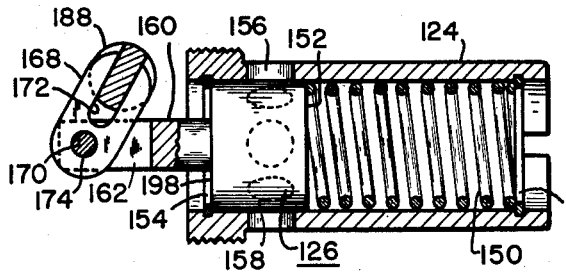
Fig. 9
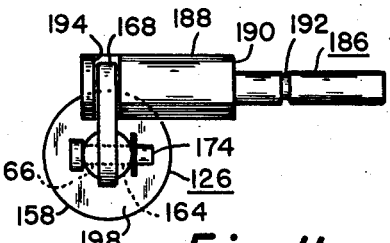
Fig. 11
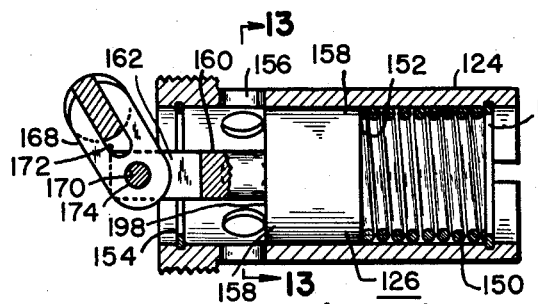
Fig. 10
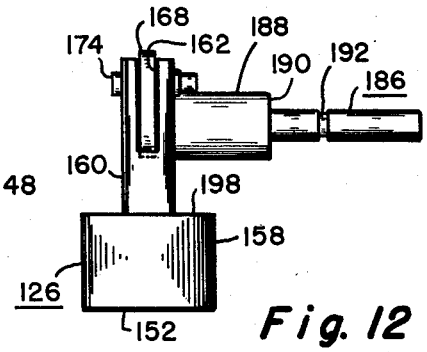
Fig. 12
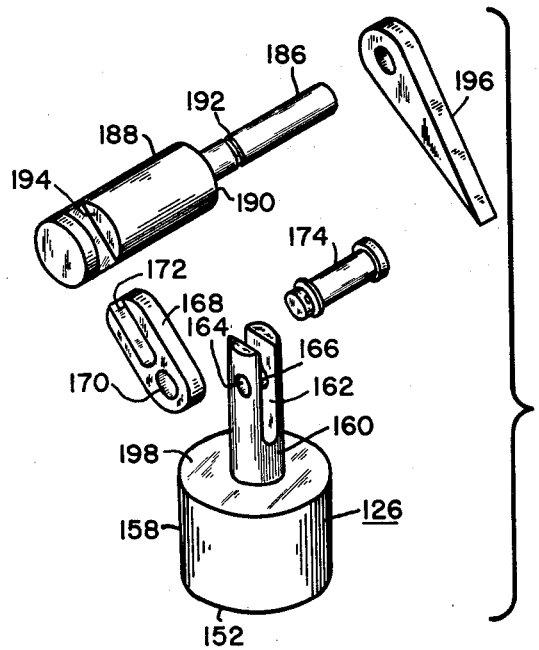
Fig. 13
Fig. 14
INVENTOR.
Herman F. Holl
BY Webb, Mackey & Burden
HIS ATTORNEYS

United States Patent Office 3,150,633
Patented Sept. 29, 1964

3,150,633
FILTER CONDITION INDICATOR DEVICE
Herman F. Holl, Pittsburgh, Pa., assignor to
Schroeder Brothers Corporation
Filed July 24, 1962, Ser. No. 212,078
7 Claims. (Cl. 116—70)

This invention relates to an indicator device associated with a by-pass valve and more particularly to an indicator device which is mechanically coupled to a by-pass valve and which indicates both the varying changes in pressure drop across a filter device and when the by-pass valve is open and fluid is by-passing the filter device.

One of the principal problems encountered in hydraulic systems and lubricating systems is fluid contamination caused by foreign particles. This is especially true where machines having such systems are subjected to dusty conditions. To minimize the problem, it is the standard practice to include a filter device in the system to filter out the foreign particles and retain them on a filter media. The filter devices are effective in maintaining relatively uncontaminated fluid as long as the filter is able to perform its function and the fluid passes through the filter media. The conventional filter devices have a limited life, which is dependent on the condition of the filter media. As the filter media collects foreign particles, the pressure drop across the media increases until a condition results where the fluid is no longer able to pass through the filter media. The conventional filter devices have as a safety factor a by-pass mechanism that is responsive to a predetermined pressure drop across the filter media. Above this predetermined pressure drop the by-pass mechanism is opened and unfiltered contaminated fluid is circulated through the system.

Indicators have been provided in the past to show that the by-pass valve is open and the fluid is by-passing the filter device. Other separate indicators have been provided to indicate the pressure drop across the filter device. Separate indicators for the above conditions have several disadvantages. Where the indicator simply shows that the by-pass valve is open, there is no warning that the filter media should be replaced. The indicator only shows, at that time, that contaminated fluid is circulating through the system. Unless the operator is fortuitously present when the by-pass valve opens and the indicator first indicates the opening of the valve, contaminated fluid can circulate through the system for a substantial time and cause substantial damage to the system. Even if the operator is fortuitously present when the by-pass valve opens, to prevent the circulation of contaminated fluid through the system, it is necessary for the operator to shut down or stop the system and then obtain a replacement filter from stock, replace the filter, and restart the system.

The indicators provided in the past to show the pressure drop across the filter media were elaborate mechanisms which in certain instances required calibration and did not satisfactorily indicate when the filter cartridge needed replacement.

With my invention I now provide an indicator device that indicates continually the condition of the filter device and also indicates when the by-pass valve is open. My indicator device proportionally designates the varying changes in the pressure drop across the filter media as it accumulates foreign particles thereon. The same indicator device is employed to indicate when the by-pass valve is open and the fluid is by-passing the filter device. Thus, with my improved indicator device it is now possible for the machine operator to determine when the filter media is accumulating a sufficient amount of foreign particles to require changing of the filter cartridge. With my indicator device it is apparent to the operator that the pressure drop across the filter media is increasing and for efficient, trouble free operation the filter cartridge should be replaced. The operator can then, while the machine remains in operation, obtain a replacement cartridge from stock and shut down the machine for a short period of time to replace the cartridge.

Briefly, my improved indicating device includes a stem connected to a pressure responsive valve that is positioned in a by-pass passageway. The stem extends outwardly beyond the housing for visual observation of the length of the stem extending from the housing. The valve member is urged into a closed position in a valve seat in the by-pass passageway by a resilient yialdable means. The pressure on the valve is responsive to the inlet pressure and when the pressure drop across the filter media increases the inlet pressure proportionally increases.

The by-pass valve is normally closed and is responsive to the pressure drop across the filter media. As the pressure drop across the filter media increases because of the collection of foreign particles on the filter media, the valve moves upwardly in a cylindrical valve seat but does not for a predetermined distance open the by-pass valve. Thus, as the pressure drop across the filter media increases, the valve moves upwardly in the cylindrical valve seat and moves the indicator stem upwardly so that a progressively larger portion of the stem extends from the housing. The operator, by visual observation of the amount of stem which extends from the housing, can then determine the relative condition of the filter media. When the pressure drop across the filter media increases above a predetermined safe pressure drop, the by-pass valve moves into an open position and exposes an additional segment of the indicator stem. Suitable marking means are provided on the stem for visual observation of whether the by-pass valve is closed or open. The stem is mechanically associated with the by-pass valve and gives a positive indication of the relative position of the by-pass valve in the cylindrical valve seat. The positive indication of the relative position of the valve in the cylindrical valve seat in turn indicates the relative pressure drop across the filter media.

This invention comprises the new and improved construction and combination of parts and their operating relation to each other which will be described more fully hereinafter and the novelty of which will be particularly pointed out and distinctly claimed.

In the accompanying drawings, to be taken as part of the specification, I have fully and clearly illustrated my invention, in which drawings:

FIGURE 9 is an enlarged sectional view of the tubular insert with the by-pass valve in the closed position.

FIGURE 10 is a sectional view similar to FIGURE 9 with the by-pass valve in the open position.

FIGURE 11 is a top plan view of the mechanical connection between the piston type valve and the pointer which is positioned externally of the housing.

FIGURE 12 is a view in elevation of the piston type valve and the linkage for the indicator device.

FIGURE 13 is a view in section taken along the lines 13—13 of FIGURE 10.

FIGURE 14 is an exploded perspective view of the piston type valve and the mechanical linkage for the indicator device.

Figures 1, 2, 3:
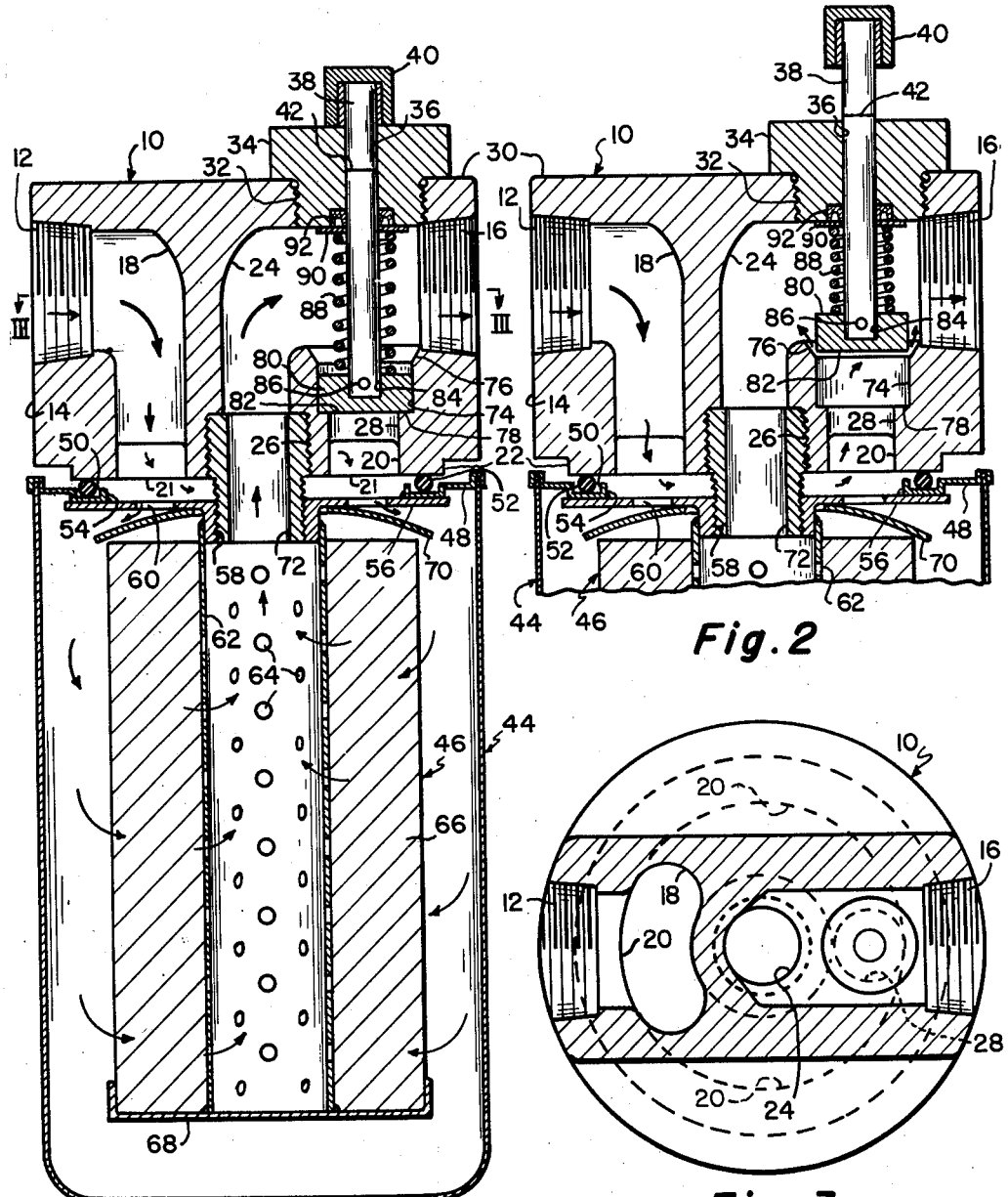
FIGURE 1 is a view in vertical section illustrating my improved filter condition indicator device.
FIGURE 2 is an upper fragmentary view of FIGURE 1 illustrating the by-pass valve in the open position.
FIGURE 3 is a view in section taken along the line 3—3 of FIGURE 1 illustrating the various passageways in the housing.
Figures 4, 5:
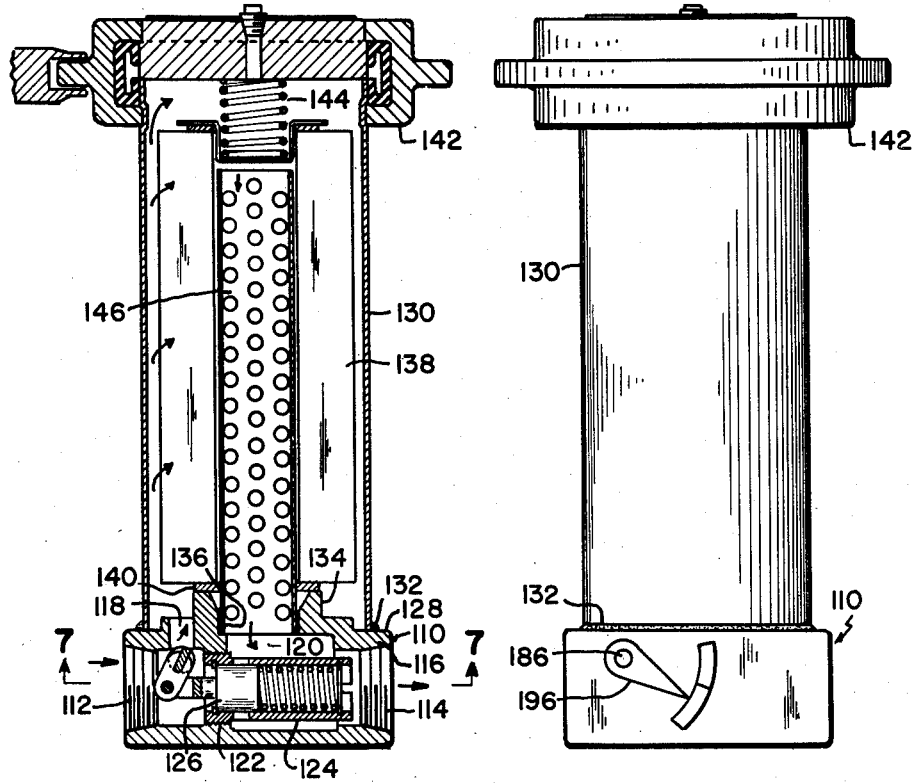
FIGURE 4 is a vertical section similar to FIGURE 1 of another embodiment of my invention.
FIGURE 5 is a view similar to FIGURE 4 illustrating the indicator device and pointer that extends outwardly of the housing.

In the drawings there is illustrated a filter head or housing generally designated by the numeral 10 which is preferably cast with the hereinafter described passageways formed therein. The housing 10 has an inlet opening 12 and an outlet opening 16 formed in the housing side wall 14. The inlet 12 and outlet 16 are aligned so that the housing 10 can be connected with existing conduits. The housing 10 has a passageway 18 which extends downwardly from the inlet opening 12. The passageway 18 has a lower annular portion 20 which is indicated in dotted lines in FIGURE 3. The annular portion 20 provides an annular opening 21 in the bottom wall 22 of housing 10. A second passageway 24 connects the outlet opening 16 with a central internally threaded opening 26 in housing bottom wall 22. A by-pass passageway 28 connects the annular portion 20 of passageway 18 with passageway 24 so that fluid may flow directly from inlet opening 12, through passageways 18 and 20 and passageway 28 to passageway 24 and leave housing 10 through outlet 16.

The housing top wall 30 has a vertical threaded bore 32 which is longitudinally aligned with by-pass passageway 28. A cap 34 having a central longitudinal bore 36 therethrough is secured in vertical bore 32. A stem type indicator 38 extends through bore 36 and is movable vertically relative to housing 10, as will be later described in detail. A cup shaped cap member 40 is positioned on the top portion of stem 38. The stem 38 has a lateral scored portion 42 intermediate its end portions.

A cup shaped casing 44 is adapted to receive a cylindrical filter member 46 therein. The cup shaped casing 44 has a circular cover plate 48 which is secured to the side walls of casing 44 by any suitable means, such as welding, crimping or the like. The cover 48 has an annular recessed portion 50 which is arranged to receive an O-ring 52 therein. The cover 48 has an annular central opening 54 through which fluid flows both into and out of the cup shaped casing 44. A circular plate member 56 having a depending cylindrical internally threaded portion 58 has a plurality of radially spaced inlet apertures 60 arranged about the cylindrical threaded portion 58. The plate 56 is secured to the under side of the cover plate annular recessed portion 50 and fluid enters the interior of casing 44 through the radially spaced apertures 60, circulates through filter 46, and is discharged from casing 44 through the threaded cylindrical portion 58. The cylindrical cartridge-type filter 46 has a tubular metallic core 62 with a plurality of apertures 64 therein. The upper edge of tubular core 62 is secured to the depending cylindrical threaded portion 58. A filter media 66 such as paper, asbestos, or the like, extends around the tubular core 62 and is supported at its lower end by a circular plate 68 which is secured to the tubular core 62. A circular plate-like check valve 70 is secured to the under side of the plate 56 and is in a normally open position wherein the valve 70 is spaced from plate 56 so that fluid can pass through apertures 60 in plate 56. The valve 70 in its open position is illustrated in FIGURE 1 with the arrows indicating the direction of flow. The check valve serves to prevent reverse flow through the filter media. The container 44 with the filter member 46 positioned therein is secured to the bottom wall of housing 10 by means of a nipple 72 threaded into aperture opening 26 and into the cylindrical threaded portion 58 of top plate 56. The O-ring 52 is positioned in recessed portion 50 and is arranged to abut housing lower wall 22 to form a fluid type seal between the housing 10 and casing 44.

With this arrangement fluid enters housing 10 through inlet opening 12, flows through passageway 18 and its annular portion 20, through apertures 60 in top plate 56, then through the filter media 66, into the central portion of the tubular core 62, through nipple 72, passageway 24 in housing 10, and then leaves the housing 10 through outlet opening 16.

The by-pass passageway 28 has a cylindrical portion with a cylindrical side wall 74 and an outwardly flared conical portion 76 above the cylindrical wall 74 and an inwardly extending shoulder 78.

A cylindrical piston-like valve member 80 has a diameter substantially equal to the diameter of the cylindrical side wall 74 so that fluid does not flow through by-pass passageway 28 until the valve member 80 is above the cylindrical side wall 74. The valve member 80 seats on the inwardly extending shoulder portion 78 and remains in a closed position until the cylindrical valve member bottom wall 82 moves upwardly beyond the juncture of the passageway cylindrical side wall 74 and the conical portion 76. The valve member 80 is illustrated in a valve open position in FIGURE 2 wherein the valve member lower wall 82 extends above the cylindrical wall portion 74. Thus, the valve member 80 must travel from a position abutting the shoulder portion 78 to a position where the valve bottom wall 82 extends into the portion of the passageway that has the conically shaped wall 76 before fluid can pass from passageway 20 through by-pass passageway 28 into passageway 24. With this arrangement there is a predetermined upward movement of valve 80 from its seated position against the shoulder 78 to a position where the by-pass valve is considered open. Valve member 80 has a central cylindrical recess 84 into which the lower end of the stem 38 extends. A pin member 86 secures the stem 38 to valve 80 for vertical movement of the stem 38 with valve 80. A coil spring 88 extends around stem 38 and abuts at its lower portion the valve 80 and at its upper portion a washer 90 which in turn abuts the lower wall of the cap 34.

Suitable annular fluid retainer means 92 is positioned in a recess in cap 34 to prevent the flow of fluid through longitudinal bore 36 in cap 34. The resilient coil spring 88 is arranged to urge the valve 80 downwardly into a closed position with the valve lower wall 82 abutting the shoulder 78. The coil spring 88 has a predetermined resiliency to maintain the valve 80 in a closed position and a predetermined pressure on the lower wall 82 of valve 80 is required to overcome the downward force exerted by the spring 88. When the pressure exceeds a predetermined pressure, the valve member 80 moves upwardly proportionally to the pressure exerted on the bottom face 82 of valve 80 until the fluid pressure increases above a predetermined value at which time the valve 80 is moved into an open position.

*Operation*

Fluid enters housing 10 through inlet opening 12, flows through passageway 18 and its annular portion 20, through apertures 60 in the top plate 56 of container 44. The fluid then flows through filter media 66 and upwardly through apertures 64 in tubular core 62 through nipple 72, passageway 24 in housing 10, and leaves housing 10 through outlet opening 16. The arrows in FIGURE 1 indicate the direction of flow. The foreign particles contained in the fluid entering housing 10 are deposited on the filter media 66. When the accumulation of foreign particles on the filter media 66 is relatively small, there is a relatively small pressure drop across the filter media and the valve 80 remains in a closed position. When additional foreign particles accumulate on the surface of filter media 66 the pressure drop across the media 66 increases and the pressure on the bottom surface of bottom wall 82 of valve 80 increases proportionately. When the inlet pressure, due to the increased pressure drop across the filter media, increases above a predetermined amount, the force exerted on the valve bottom wall 82 is greater than the downward closing force exerted by spring 88 so that valve 80 begins to move upwardly away from shoulder portion 88. The stem 38 concurrently, because of its connection to valve 80, moves upwardly therewith. Above any predetermined pressure drop through filter media 66 wherein the valve 80 begins to move upwardly, the stem 38 indicates the same externally of the housing 10. Thus when the cap 40 is spaced from the top wall of cap 34 there is a visual indication that the pressure drop across the filter media has increased to a degree that the valve 80 is moving vertically upward in the passageway 28. This indicates to the operator that within a short period of time the filter device which includes the filter media 66 should be replaced. The valve 80 continues to move upwardly in proportion to the increase in pressure caused by the increased pressure drop across the filter media 66. Thus by observation of the relative amount of stem 38 which extends out of housing 10 a relatively accurate indication of the condition of the filter media is obtained.

When the filter media 66 collects a sufficient amount of foreign material that it is for all practical purposes clogged, the pressure drop across the filter media is greater than the pressure required to oppose the downward force of spring 88. The valve 80 moves into an open position as indicated in FIGURE 2. Thus the by-pass passageways 28 between passageways 18 and 24 is opened and fluid by-passes the filter media 66 completely. When the valve 80 moves upwardly to a valve open position, the scored portion 42 of stem 38 is above the top wall of cap 34 and indicates to the operator that the by-pass valve is open and contaminated fluid is being circulated through the system. Thus with a single indicating device I have now provided a means of indicating both the increasing pressure drop across the filter media as foreign particles accumulate on the surface of the media, and also when the accumulation of foreign particles on the filter media 66 has required by-pass valve 80 to open.

Referring to the embodiment illustrated in FIGURES 4 through 14, there is shown a housing generally designated by the numeral 110 which is preferably cast with the hereinafter described passageways formed therein. The housing 110 has an inlet opening 112 and an outlet opening 114 formed in the housing side wall 116. The housing 110 has a passageway 118 connected to the inlet opening 112 and a second passageway 120 connected to the outlet opening 114. Between the passageways 118 and 120 there is a threaded by-pass passageway 122 into which a threaded tubular member 124 is secured. Positioned within the tubular member 124 is a piston type valve 126 which closes the passageway 122 between passageways 118 and 120.

The housing top wall 128 has a tubular filter casing 130 secured thereto by means of an annular weld 132. The housing top wall 128 has an upstanding annular shoulder portion 134 and a central bore 136. An annular filter cartridge 138 is positioned on the annular shoulder 134 with a fluid seal washer 140 therebetween. A cap member 142 encloses the tubular filter casing 130 and a resilient means 144 urges the filter cartridge 138 into abutting relation with housing shoulder 134. With this arrangement, passageway 118 is in communication with the filter casing 130, and the central bore 136 is in communication with the tubular core 146 of filter 138. Thus, fluid under pressure enters through inlet 112, flows through passageway 118 into filter casing 130, through the filter 138 and downwardly through the central core 146, through bore 136 into passageway 120 and out through outlet opening 114. Under normal operating conditions the fluid passes through the filter and the by-pass valve 126 remains in a closed position.

The tubular member 124 is threadedly secured to by-pass passageway 122 and extends into passageway 120. The tubular member has a retainer means 148 such as a snap ring or the like and a spring 150 abuts the retainer means at one end and the lower wall 152 of valve member 126 at the other end. Another snap ring type stop means 154 is positioned adjacent the upper portion of the tubular member 124 and limits movement of the valve 126 under the force of spring 150. The tubular member 124 has a plurality of radial apertures 156 which are formed on substantially the same lateral plane. The valve 126 has cylindrical side wall 158 which has substantially the same dimension as the inner circumference of the tubular member 124. In this manner when the valve 126 is positioned as illustrated in either FIGURES 4 or 7 the valve cylindrical side wall 158 is in overlying relation with the apertures 156 in tubular member 124 and thereby maintains the by-pass passageway 122 closed.

The valve member 126 has a longitudinally extending arm 160 with a longitudinal slot 162 therein. The arm 160 has a pair of aligned apertures 164 and 166. A clevis member 168 has an aperture 170 adjacent one end and a longitudinal slotted portion 172 adjacent the other end. The clevis is arranged to be positioned within the slotted portion 162 of valve arm 160 and pin 174 extends through the apertures 164, 166, and aperture 170 of clevis 168 to thereby pivotally secure clevis member 168 to valve arm 160.

Figure 8:
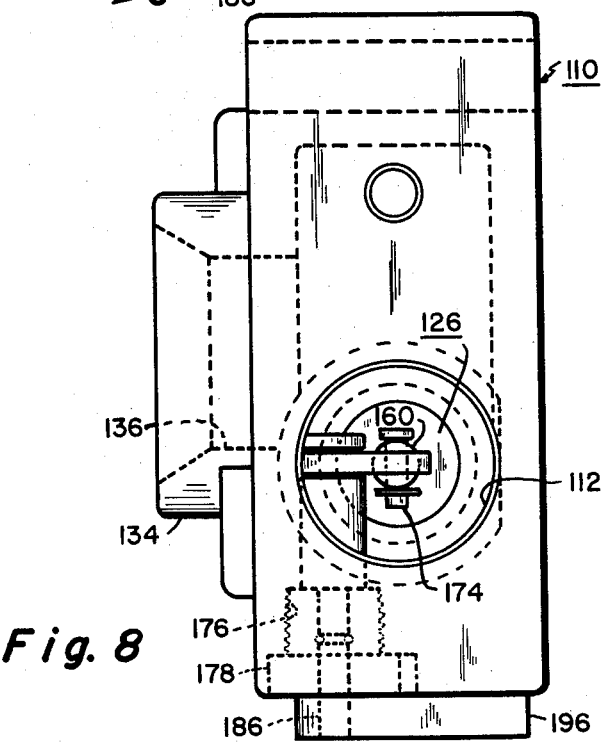
FIGURE 8 is a view taken along the line 8—8 of FIGURE 7.

The housing 110 has a threaded bore 176 extending into the side wall transversely to the inlet and outlet openings. Positioned within the threaded bore 176 is a threaded shaft receiver 178. The shaft receiver has a longitudinal bore 180 with an annular recessed portion 182 which is arranged to receive an O-ring 184. A shaft 186 has an enlarged end portion 188 forming a shoulder 190. The shaft 186 is positioned with the shoulder in abutting relation with the end wall of the threaded shaft receiver 178 with the shaft extending through the bore 180. Shaft 186 has an annular recessed portion 192 in which O-ring 184 is positioned to provide a fluid seal between shaft 186 and receiver 178. With this arrangement shaft 186 is rotatable with the shaft receiver 178 and thus rotatable relative to the housing 110. The shaft enlarged portion 188 has a pair of parallel transverse recessed portions 194 and clevis slotted portion 172 extends into the recessed portion 194 to nonrotatably secure the clevis 168 to the shaft 186. As illustrated in FIGURE 8, the shaft 186 is positioned above the valve arm 160 so that longitudinal movement of valve 126 in tubular member 124 pivots clevis 168 which, in turn, rotates shaft 186. A pointer 196 is nonrotatably secured to the end of shaft 186 so that rotation of the shaft 186 may be observed outside of the housing.

The surface area of valve member bottom wall 152 is substantially equal to the surface area of the top wall 198 plus the surface area of the end of arm 160. This type of valve functions satisfactorily in high pressure systems to indicate the condition of the filter.

*Operation*

Fluid enters housing 110 through inlet opening 112, flows through passageway 118 into the filter casing 130. The fluid then flows through the filter medium 138 and downwardly through tubular core 146 to passageway 120 and leaves housing 110 through outlet opening 114. The arrows in FIGURE 4 indicate the direction of flow. The foreign particles contained in fluid entering housing 110 are deposited on the filter media 138. When the accumulation of foreign particles on filter media 138 is relatively small, there is a relatively small pressure drop across the filter media and the by-pass valve 126 remains in closed position due to the spring 150.

When sufficient foreign particles accumulate on the surface of filter media 138, the pressure drop increases and there is a pressure differential across valve 126. When this pressure differential increases above the closing force of spring 150, the valve moves within the tubular member 124. When the pressure drop across the filter media increases above a predetermined amount, the force exerted on the valve member 126 moves the valve member longitudinally in the tubular member 124. This movement of the valve member 126 is indicated by means of pointer 196. Thus, when the pointer 196 moves, there is a visual indication that the presure drop across the filter media has increased to a degree that the valve 126 is moving in the tubular member 124. This indicates to the operator that within a short period of time the filter media 138 should be replaced. The valve 126 continues to move longitudinally in the tubular member 124 in proportion to the increase in pressure caused by the increased pressure drop across the filter media 138. Thus, by observation of the relative movement of pointer 196 which extends beyond the housing 110 a relatively accurate indication of the condition of the filter media is obtained.

Figure 6:
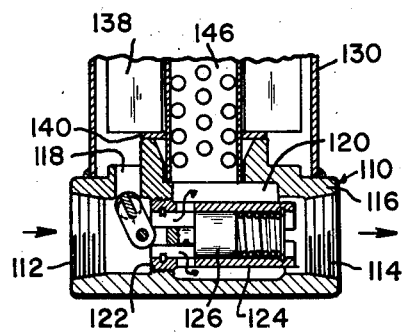
FIGURE 6 is a fragmentary sectional view similar to FIGURE 4 illustrating the by-pass valve in the open position.
Figure 7:
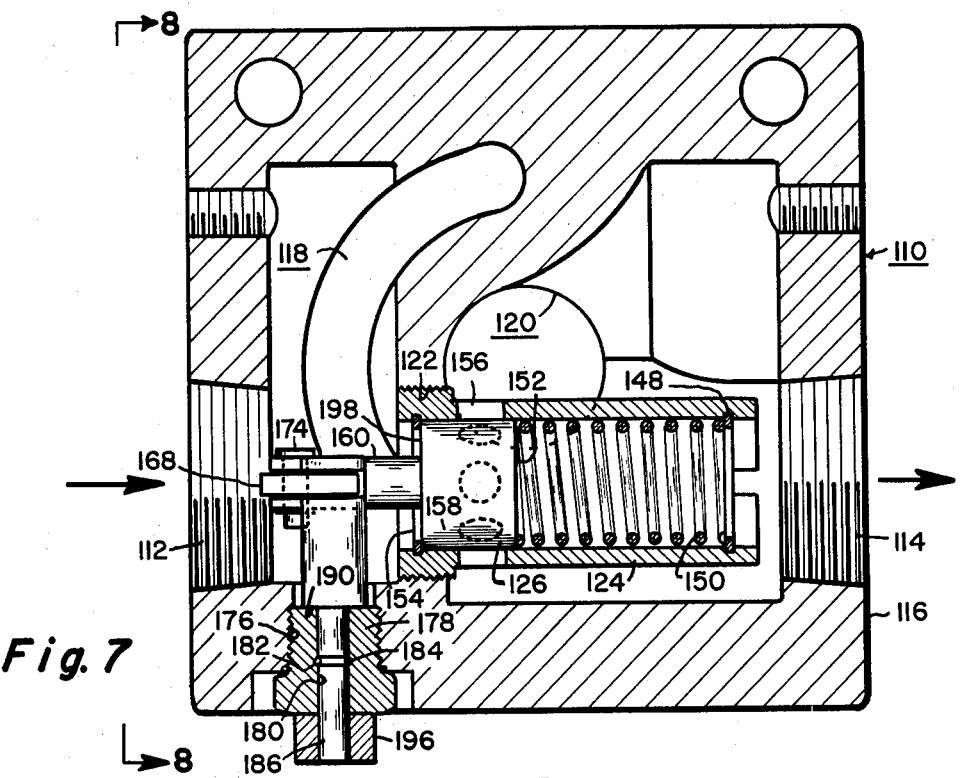
FIGURE 7 is an enlarged view in section taken along the line 7—7 of FIGURE 4 illustrating the detailed construction of my improved indicator device.

When the filter media 138 collects a sufficient amount of foreign material that it is for all practical purposes clogged, the pressure drop across the filter media is greater than the pressure required to close the spring 150. The valve 126 then moves longitudinally in the tubular member 124 to an open position as indicated in FIGURE 6 to uncover the radial apertures 156. In this manner the by-pass passageway 122 between passageways 118 and 120 is opened and fluid by-passes the filter media 138. When the valve moves to a valve open position the pointer 196 indicates to the operator that the by-pass valve is open and contaminated fluid is being circulated through the system.

According to the provision of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. An indicator device associated with a valve comprising a housing having a passageway therein, said passageway having side walls, a tubular insert secured to said passageway side walls, said insert having radial apertures adjacent one end, a cylindrical valve member positioned in said tubular insert, resilient means arranged to urge said cylindrical valve member into overlying relation with said radial apertures to thereby close said passageway, indicator means connected to said valve member and arranged to indicate the relative position of said valve member in said insert, said valve member being responsive to the pressure of fluid in said passageway and operable at first predetermined fluid pressure in said passageway to move said valve member in said passageway a predetermined distance, said indicator device connected to said valve member indicating the relative movement of said valve member in said insert, said valve member arranged to move said predetermined distance and maintain a portion thereof in overlying relation with said insert apertures to maintain said passageway closed to the flow of fluid therethrough, said valve member being further responsive above another predetermined pressure to move to another position in said insert so that said valve member is spaced from said insert apertures to open said passageway for the flow of fluid therethrough, said indicator device arranged to indicate that said passageway is open for the flow of fluid therethrough.

2. An indicator device to indicate the condition of a filter comprising, a housing, a filter casing secured to a first wall of said housing, said filter casing having an annular inlet opening and a central outlet opening, an annular filter device positioned in said filter casing between said annular inlet opening and said central outlet opening so that fluid circulating through said filter casing passes through said filter device, said housing having a first inlet opening and a first outlet opening, said housing first outlet opening mating with said filter casing annular inlet opening for flow of fluid from said housing inlet opening to said filter casing, said housing having a second inlet opening and a second outlet opening, a second passageway connecting said second inlet opening and said second outlet opening, said housing second inlet opening mating with said filter casing outlet opening for passage of fluid from said casing through said housing, said housing having a by-pass passageway connecting said first passageway and said second passageway, a tubular member forming a portion of said by-pass passageway, said tubular member having a plurality of radial apertures adjacent one end, a cylindrical piston type valve member positioned within said tubular member and arranged to prevent the flow of fluid through said by-pass passageway and through said radial apertures, said valve member having an elongated body portion substantially larger than said radial apertures, said valve member being movable longitudinally in said tubular member, resilient means urging said valve member into overlying relation with said radial apertures, stop means associated with said tubular member limiting movement of said valve member, said valve member having a longitudinally extending connecting portion extending into said first passageway, said housing having a shaft rotatably secured thereto in transverse relation to said valve connecting portion, and connecting means connecting said valve connecting portion to said shaft so that longitudinal movement of said valve in said tubular member rotates said shaft, said shaft having a portion extending through said housing, an indicator secured to said shaft externally of said housing and indicating relative rotation of said shaft, said valve member being responsive above a first predetermined fluid pressure in said first passageway to move said valve member a predetermined distance in said tubular member and maintain a portion of said valve member in overlying relation with radial apertures to maintain by-pass passageway closed to the flow of fluid therethrough, said indicator positioned externally of said housing indicating the relative movement of said valve member, said valve member being further responsive above another predetermined pressure to move said valve member away from said radial apertures to permit flow of fluid around said filter device and through said by-pass passageway, said indicator indicating the relative movement of said valve member and that said fluid is by-passing said filter device.

3. A filter condition indicator device comprising;
(A) a housing having,
  (1) an inlet passageway,
  (2) an outlet passageway,
  (3) means for securing a filter casing to the housing,
  (4) a first passageway connecting said inlet passageway to one side of a filter cartridge positioned in said casing,
  (5) a second passageway connecting said outlet passageway to the other side of the filter cartridge positioned in said casing,
(B) a third passageway in said housing connecting said inlet and outlet passageways and bypassing said filter cartridge,
(C) a valve member movable in said third passageway to open and close the passageway, said valve member closing the passageway when in a first position in the passageway and opening the passageway when in a second position in the passageway, (D) means in the third passageway cooperating with the valve member to close the passageway when the valve member is in said first position and to open the passageway when it is in the second position, (E) resilient means urging said valve member into said first closing position, (F) indicator means connected to said valve member to indicate the position of the valve member in the third passageway, (G) said valve member being responsive to the pressure of fluid in said passageway and operable above a first predetermined fluid pressure to move in said passageway a predetermined distance, said indicator device associated with said valve member indicating the relative movement of said valve member in said passageway, said valve member being further responsive above another predetermined pressure to move to another position in said passageway and to open said passageway for the flow of fluid therethrough, said indicator device connected to said valve member indicating that said valve member has moved to said other position in said passageway and said passageway is open.

4. A filter condition indicator device as described in claim 3 in which said indicator means comprises a stem connected at one end to said valve member, said stem having a portion extending through and outside said housing, said stem being movable with said valve member so that the portion of said valve stem protruding from said housing indicates the relative position of said valve member in said passageway.

5. A filter condition indicator device as described in claim 3 in which the third passageway has a radially extending shoulder against which said valve member abuts to close the passageway and an outwardly flaring portion adjacent said second opening position to permit the flow of fluid around said valve member.

6. A filter condition indicator device as described in claim 3 in which the third passageway has outlet apertures connecting it with said outlet passageway and in which said valve member when in the first closing position blocks said outlets and when in the second opening position clears said outlets.

7. A filter condition indicator device as described in claim 3 in which the indicator means comprises a shaft rotatably secured in said housing and arranged transversely to the longitudinal axis of said valve member, and connecting means connecting said shaft to said valve member so that longitudinal movement of said valve member rotates said shaft, said shaft having a portion extending outwardly through said housing, and a position indicator secured to said shaft to indicate the relative rotation of said shaft to said housing.

References Cited in the file of this patent

UNITED STATES PATENTS

| | | |
|---|---|---|
| 1,706,051 | Auchincloss | Mar. 19, 1929 |
| 1,994,770 | King | Mar. 19, 1935 |
| 2,843,077 | Leefer | July 15, 1958 |
| 2,849,022 | Kramer | Aug. 26, 1958 |
| 3,011,470 | Stoermer | Dec. 5, 1961 |
| 3,028,009 | Scavuzzo et al. | Apr. 31, 1962 |
| 3,036,592 | Lips | May 29, 1962 |
| 3,056,379 | Thomas | Oct. 2, 1962 |
| 3,076,335 | Rosaen | Feb. 5, 1963 |
| 3,080,016 | Thomas | Mar. 5, 1963 |

FOREIGN PATENTS

| | | |
|---|---|---|
| 296,973 | Switzerland | May 17, 1954 |